United States Patent [19]
Quinn et al.

[11] 3,977,971

[45] Aug. 31, 1976

[54] METHOD OF FEEDING POLYMERS

[75] Inventors: John E. Quinn, Doylestown; Joseph I. Gerstemeier, Phoenixville, both of Pa.

[73] Assignee: Betz Laboratories, Inc., Trevose, Pa.

[22] Filed: Dec. 3, 1974

[21] Appl. No.: 529,209

[52] U.S. Cl. .................................. 210/49; 210/54; 37/58
[51] Int. Cl.$^2$ ........................................ B01D 21/01
[58] Field of Search ........ 37/58; 210/42, 49, 51–54; 260/79.3, 29.6 SQ

[56] References Cited
UNITED STATES PATENTS

| | | | |
|---|---|---|---|
| 2,685,369 | 8/1954 | Crossley | 210/49 |
| 3,377,274 | 4/1968 | Burke et al. | 210/54 |
| 3,544,456 | 12/1970 | Shanfelt et al. | 210/54 |
| 3,573,263 | 3/1971 | Gill | 260/79.3 MU |
| 3,666,663 | 5/1972 | Walker | 210/49 |
| 3,734,873 | 5/1973 | Anderson et al. | 260/29.6 SQ |
| 3,817,891 | 6/1974 | Kleas | 260/29.6 E |
| 3,917,529 | 11/1975 | Madole et al. | 210/54 |

FOREIGN PATENTS OR APPLICATIONS

| | | | |
|---|---|---|---|
| 1,255,558 | 12/1971 | United Kingdom | 37/58 |

*Primary Examiner*—Thomas G. Wyse
*Assistant Examiner*—Peter A. Hruskoci
*Attorney, Agent, or Firm*—Alexander D. Ricci; Steven H. Markowitz

[57] ABSTRACT

The present disclosure is directed to an improved method of flocculating solids dispersed and suspended in an aqueous medium which is undergoing a turbulent shearing action. The method of the invention is directed to the addition of particles of the polymeric materials to the aqueous medium as opposed to solutions thereof.

11 Claims, No Drawings

METHOD OF FEEDING POLYMERS

BACKGROUND OF THE INVENTION

As is well documented and known, high molecular weight polymers which are cationic, non-ionic, anionic or polyamphalytic in nature have found extensive use in the liquids-solids separation field. More specifically, these polymers have been used extensively either alone or in combination with other aids in the flocculation or coagulation of water-insoluble particles suspended in an aqueous medium.

As an off-spring of the use of these polymers in the influent and effluent water of industrial, domestic and agricultural water systems, these polymers have been used in the dredging operations. However, the degree of success in the latter operation has been quite limited in both performance and economy.

The polymers when used as flocculating agents are utilized as solutions with varying degrees of concentration. High molecular weight polymers, although effective as flocculating agents, have a definite disadvantage in that only small concentrations (0.25 to 5%) of such can be produced and to accomplish this generally requires expensive and sophisticated equipment. Numerous methods and various equipment designs have been proposed and in some cases developed for this purpose with limited success. The successful apparatus has been very large, complex, and expensive. These aspects of the technology have limited the use of these polymeric materials significantly. The polymers used for these purposes described, generally have molecular weights of from about 800,000 to 20,000,000. Accordingly, these sophisticated molecules, because of their high molecular weights, are not easily dissolved so as to produce concentrated solutions. They have in actuality rather limited solubility from a handle-ability standpoint since the ultimate solutions have viscosities which are quite high and therefore not easily handled or pumped. In fact, 0.5% solution of a polymer having a molecular weight of 8,000,000 resembles a gel and, as can be appreciated, the viscosity made such virtually unusable for the purpose.

When attempts were made to utilize these polymeric solutions in dredging operations, great difficulty was experienced in feeding the necessary amounts since it was difficult to mix the necessary amount within the time frame allowed. The output of the pumps used to propel the aqueous medium frequently has capacities to move from 5,000 to 60,000 gallons of aqueous medium per minute. These systems are designed to produce highly turbulent flows in order to maintain the dredge material in suspension. It was also discovered that when attempts were made to feed the polymer solutions, the polymers did not operate effectively and that even with the amount of polymer feed increased, only a small increase in effectiveness was experienced. It is believed that the shearing action experienced by the polymers drastically affects the chain length, i.e., molecular weight.

The objective of feeding polymers to the aqueous medium being pumped is to affect more rapid and more complete flocculation of the suspended matter at the location where the dredged material is placed into the container of a barge, or what is referred to as a dredge material containment area.

It would be most desirable to have flocculants which perform effectively under these rather drastic, abrasive and rapid pumping systems, since dredging operations have been under the careful scrutiny of the Federal, State, and Municipal Environmental Protection Agencies. With most dredging operations, there is a certain amount of suspended matter, such as silt, which does not readily settle in the containment area. The dispersed silt obviously effects not only the aesthetics and utilability of the body of water, but also can effect marine life in general. Accordingly, the authorities have been quick to regulate dredging operations to assure that the environment is fully protected.

The present inventors, while working in this area and after having been only moderately successful with the feeding and use of liquid polymeric flocculants, decided that if flocculents were to be utilized with any degree of success, certain techniques for feeding polymeric materials had to be devised in order to avoid the costly problems inherently experienced and to allow for the obtention of the ultimate effectiveness of the flocculants.

GENERAL DESCRIPTION OF THE INVENTION

The present inventors discovered that if the polymeric flocculants were fed to the aqueous medium being pumped, and therefore undergoing turbulent and shearing action, in the form of discrete particles as opposed to liquid form, expensive feeding equipment, and therefore costs, could be minimized and ultimate effectiveness could be achieved. It was the opinion of the inventors, and as documented in published materials, that the effectiveness of long chain - high molecular weight flocculants was greatly affected by the turbulent and shear effect of the aqueous medium to which it was added. The flocculants depend for their activity on a combination of a long chain (high molecular weight) and the distribution of polar or non-polar groups disposed thereon. It was determined that if the long chains of the molecule were broken or sheared apart, which is likely under turbulent conditions, and particularly where the aqueous medium contains rapidly moving solid particles, that the shorter molecules resulting were no longer effective for the purpose. In addition, continued term turbulence and shear had a tendency to break flocs composed of the flocculant and the suspended matter, thereby causing both to be somewhat more difficult to settle where desired.

The present inventors, operating under this premise, believed that if flocculants were added to particulate form that the turbulence of the aqueous medium would first operate to dissolve the flocculant and thereby permit the flocculant to perform its function without being destroyed by the shearing action of the aqueous medium.

To perhaps explain the advancement somewhat more specifically, a typical dredging system could be considered. A basic dredging system is composed of three basic elements: (i) a pump attached on the suction side to (ii) a ladder having a cutting head which is responsible for the actual dredging, and (iii) piping used to deliver the dredged material from the discharge side of the pump to the location for discharge. The latter piping may be used to exemplify the distance travelled by the dredged material. These pipes may extend as little as a few hundred feet to as much as 8000 feet.

To assure proper dissolution of the polymer in the aqueous medium, the polymer may be fed anywhere in the dredging system but preferably close to either the suction or the discharge side of the pump. In either instance, an appropriate feeding hole is cut into the designated section and the particles of polymer gravimetrically fed with for example a vibrating feeder to assure continual and uniform feed. However, better controls are attainable if the polymeric particles are fed as a suspension, i.e., they are either suspended in water and the resulting aqueous slurry is fed using a feed pump or the particles are suspended in a water-soluble or miscible media such as the lower alcohols, e.g., isopropanol or the polyhydric alcohols such as ethylene glycol, polyethylene glycol, propylene glycol, etc. in which the polymer is substantially insoluble and the resulting suspension is fed.

Most desirably, in order to achieve proper dissolution of the polymer in the medium being pumped, the particles should have an average size of from about 170 (USS14) to about 1,400 (USS80) microns.

The polymeric flocculants which have been used for the purposes of the invention are those water-soluble high molecular weight polymers having non-ionic, cationic, anionic or even amphalytic characteristics which can be and preferably are recovered during their respective production in solid particulate form. The objective is to feed these polymers in undissolved particle form to thereby avoid the shearing of the molecule. Accordingly, only polymeric material which is recovered in solid form is utilizable.

The type polymers contemplated for use in accordance with the present invention are those cationic and anionic polymers which are the subject of U.S. Pat. No. 3,573,263 and have molecular weights in the range of 800,000 to 20,000,000. The flocculant polymers need not have the high molecular weight specified above so long as they are effective for the purpose. However, the high molecular weight polymers have been found to be the most effective due to their superior flocculating characteristics. The invention is not limited to any specific flocculants excepting those of course which can be recovered in solid particulate form. The flocculants which may be employed contain most preferably a plurality of polar groups such as quaternary ammonium groups, sulfonium, amino, sulfonate, carboxyl amido, etc. along its molecular chain. Typical flocculants which are useful for the present purposes include polyacrylic acid and its water-soluble salts, polyacrylamide, copolymers of acrylamide with vinyl acetate, methacrylamide, methacrylic acid, acrylic acid, dimethyl or ethyl aminomethyl or ethyl acrylate, vinylbenzene sulfonic acids, vinyl toluenesulfonic acids, vinyl benzyl trialkyl ammonium hydroxide and the like and the water-soluble salts thereof. In addition, polymers such as polyvinylbenzene sulfonic acid, polyvinyl toluene, polyvinyl benzyl trialkylammonium salts, poly-2-amino ethyl methacrylate salts and polymers or copolymers of moleric anhydride and monoethylenically unsaturated compounds. Betz Laboratories, Inc. has a product line designated Betz Polymers 1100, 1110, 1120, 1130, 1160 and 1170 which are various copolymers of acrylamide with acrylic acid or a di lower alkyl amino lower alkyl acrylate such as dimethyl aminomethylacrylate and diethylaminoethylacrylate. These polymers are preferred since they are solids in their final form and they are extremely effective flocculants. Since large quantities of solutions are not easily or inexpensively produced, they lend themselves quite readily to the inventive feed method. Because of the high viscosities of small concentration solutions, i.e., 0.5 to 5% polymer, it is extremely impractical to use solutions since normal feed requirements may range from for example 200 to 300 pounds of polymer an hour. Since space on a dredging barge is quite limited and the operation is usually located in a remote area, the practical aspects of making and storing polymeric solution from the equipment, power and space aspects are not feasible. The Betz polymers are produced using the acrylamide as the primary monomer copolymerized with from 5 to 50 weight percent of either the acrylic acid or sodium acrylate, or the lower alkyl amino alkyl acrylates.

The quantity of flocculants used depends of course on the severity of the problem and the type of matter which is being dredged and accordingly suspended. As little as 0.002 lb per ton of solids treated has been successful. However, from about 0.01 to 1.5 lb per ton was found to be the normal case with feed rates in some instances being as high as 15 to 28 lbs per ton.

SPECIFIC EMBODIMENTS

In order to establish the on-site effectiveness of the invention, a field trial was conducted in conjunction with a dredging company's operation in the Southeastern United States.

The operation was basically directed to the filling of a cut made through a swamp area. In this type operation, a cut is made through the swamp by digging out the organic non-supporting material to a depth where a solid base is found. The dimensions of the cut are of course in accordance with the dimensions of the final road support bed and in the direction of the ultimate road. Once a cut with a solid base is made, the cut was then filled with more supportive materials such as clay, sand, shells, dirt, etc. which was being dredged from the bottom of a river closely located.

The actual dredge which was located in the river was connected to the cut by 8000 feet of 27½ inch diameter piping. The ladder of the dredging system bearing the cutting head and the piping system were connected through a pump capable of pumping 40,000 gallons per minute (gpm). The actual pumping rate was 32,000 gpm which provided a speed of 18 ft/sec. to the aqueous medium being pumped.

A slurry preparation system was connected on the suction side of the dredge pump by means of a 2 inch pipe. The polymer slurry preparation system was fitted with a Penberthy 65-P ejector (includes water to water educator).

The system was further fitted with oversized bin to hold the large quantities of polymer needed for this application. The dredge system was operated with no treatment and samples of the pipeline discharge were taken and subjected to settling rate tests which involve the agitation of the material in 250 milliliter graduated cylinders and allowing the material to stand undisturbed while observing the position of the liquid solid interface and time intervals. It was found that there had been virtually no movement of this interface at the 5 minute interval.

The polymer system was then activated utilizing an anionic copolymer of 60 weight percent acrylamide and 40 weight percent sodium acrylate having a molecular weight of about 3 million at a rate of 100 lbs per hour. Again, samples were taken from the pipeline dredge effluent and subjected to settling rate tests identical to those for the untreated samples. It was determined that all treated samples exhibited a settling interface at below the 200 ml mark with 50% of the sample settling below the 150 ml mark in the 5 minute interval period. The polymer system was allowed to operate for an extended period of time and then shut down. Again, untreated samples were secured and settling rate tests indicated that they were essentially the same as previous untreated samples.

The polymer feed system was again activated and the feed rate was reduced to 80 lbs per hour. The subsequent samples taken from the discharge demonstrated that again all of the samples showed an interface settled to below the 200 ml mark with 80% of the sample settling to below the 150 ml mark. Again the system was discontinued and untreated samples showed that the material still remained consistent with virtually no settling at the 5 minute time interval.

The polymer feed system was again activated and the feed rate was adjusted to 57 lbs per hour. Samples again were taken from the pipeline dredge discharge and showed that the settling interface reached the 200 ml mark for all the samples but only 40% settled to below the 150 ml mark.

As a result of this experience, it was concluded that the system functioned very close to the parameters expected based on extensive laboratory study. The trial proved that there was virtually no degradation of the polymer activity by the shear forces exerted by the dredge pump, which the inventors felt was a necessity if polymeric materials were to be used successfully under the stated severe and drastic conditions.

Although this invention as described relates to the treatment of solids being transported by pipeline as practiced in the dredging industry, it is obvious that the practice of the invention could be readily extended to other systems where solids are being transported in an aqueous media through a pipeline. Examples of where this could be practical would include the transmission of coal slurries, tailings from ore beneficiation processes, the inplant transfer of cement, clay or lime slurries.

Having thus described the invention, what is claimed is:

1. A method of feeding a water-soluble polymeric flocculant having a molecular weight of from about 800,000 to about 20,000,000 to an aqueous medium having solid matter dispersed and suspended therein, which medium is being pumped and therefore undergoing a turbulent shearing action, which method comprises adding an effective amount of said polymeric flocculant as discrete particles having an effective size range to achieve dissolution in said aqueous medium, to reduce the effect of said turbulent shearing action on the molecular weight and flocculating activity of said polymeric flocculant after said polymeric flocculant dissolves in said aqueous medium.

2. A method according to claim 1 wherein the particles have a particle size of from about 170 to 1400 microns.

3. A method according to claim 1 wherein the particles are fed as a suspension.

4. A method according to claim 3 wherein the particles are fed as an aqueous slurry.

5. A method according to claim 4 wherein the particles have a particle size of from about 170 to 1400 microns.

6. A method according to claim 5 wherein the polymer is selected from the group consisting of cationic, non-ionic and anionic polymers of acrylamide.

7. A method according to claim 1 wherein the medium being pumped is derived from a dredging operation.

8. A method according to claim 1 wherein the medium contains dispersed and suspended therein at least one of the group of siliceous material, silt and organic matter.

9. A method according to claim 8 wherein the particles have a particle size of from about 170 to 1400 microns.

10. A method according to claim 9 wherein the particles are fed as a suspension.

11. A method according to claim 10 wherein the suspension is an aqueous slurry.

* * * * *